(12) United States Patent
Kubita (10) Patent No.: US 10,810,978 B2
(45) Date of Patent: Oct. 20, 2020

(54) PERFORMANCE ASSISTANCE APPARATUS AND METHOD

(71) Applicant: YAMAHA CORPORATION, Hamamatsu-shi (JP)

(72) Inventor: Akemi Kubita, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/522,796

(22) Filed: Jul. 26, 2019

(65) Prior Publication Data

US 2019/0348013 A1 Nov. 14, 2019

Related U.S. Application Data

(63) Continuation of application No. PCT/JP2018/008102, filed on Mar. 2, 2018.

(30) Foreign Application Priority Data

Mar. 3, 2017 (JP) .................................. 2017-040599

(51) Int. Cl.
*G10G 1/02* (2006.01)
*G10H 1/00* (2006.01)

(52) U.S. Cl.
CPC ............. *G10G 1/02* (2013.01); *G10H 1/0016* (2013.01); *G10H 2210/066* (2013.01); *G10H 2210/571* (2013.01); *G10H 2220/091* (2013.01)

(58) Field of Classification Search
CPC ................................ G10G 1/02; G10H 1/0016
See application file for complete search history.

(56) References Cited

U.S. PATENT DOCUMENTS

| | | |
|---|---|---|
| 4,331,062 A | 5/1982 | Rogers |
| 5,690,496 A | 11/1997 | Kennedy |

(Continued)

FOREIGN PATENT DOCUMENTS

| | | |
|---|---|---|
| JP | S54113524 U | 8/1979 |
| JP | H0627938 A | 2/1994 |

(Continued)

OTHER PUBLICATIONS

International Search Report issued in Intl. Appln. No. PCT/JP2018/008100 dated May 22, 2018. English translation provided.

(Continued)

*Primary Examiner* — Robert W Horn
(74) *Attorney, Agent, or Firm* — Rossi, Kimms & McDowell LLP (57) ABSTRACT

To assist a human player in performing a plurality of foot operators (pedal keys) operable with a human player's foot, a foot operator image indicative of the foot operator group is displayed on a display screen. Chord information of a chord to be performed is acquired, and a pitch of a bass note corresponding to the chord indicated by the acquired chord information is identified. A particular foot operator corresponding to the identified pitch of the bass note is visually designated on the foot operator image displayed on the display screen. An object indicative of a chord name is displayed on the same display screen. Objects indicative of one or more chord names corresponding to a chord progression over a plurality of measures is displayed. A display object highlighting one object indicative of a particular chord name is added in accordance with a progression of a performance.

20 Claims, 7 Drawing Sheets

(56) References Cited

U.S. PATENT DOCUMENTS

| | | | |
|---|---|---|---|
| 5,739,457 | A | 4/1998 | Devecka |
| 6,084,167 | A | 7/2000 | Akimoto |
| 6,388,181 | B2 | 5/2002 | Moe |
| 6,586,666 | B2 | 7/2003 | Abe |
| 7,030,309 | B2 | 4/2006 | Kubita |
| 7,220,907 | B2 * | 5/2007 | McIntosh ............ G09B 15/002 84/477 R |
| 7,361,829 | B2 | 4/2008 | Uehara |
| 7,642,440 | B2 | 1/2010 | Bailey |
| 7,767,898 | B2 | 8/2010 | Nakayama |
| 7,893,337 | B2 | 2/2011 | Lenz |
| 8,017,854 | B2 | 9/2011 | Foster |
| 8,158,873 | B2 | 4/2012 | Ivanich |
| 8,303,409 | B2 | 11/2012 | Tsubakisawa |
| 8,338,684 | B2 * | 12/2012 | Pillhofer ................ G09B 15/00 84/470 R |
| 8,350,142 | B2 | 1/2013 | Fujiwara |
| 8,766,077 | B2 * | 7/2014 | Soejima ................ G09B 5/00 84/477 R |
| 8,785,757 | B2 | 7/2014 | Pillhofer |
| 8,895,829 | B2 * | 11/2014 | Soejima ............... G10H 1/0016 84/485 R |
| 8,987,573 | B1 | 3/2015 | Lippens |
| 9,808,724 | B2 | 11/2017 | Bala |
| 9,836,992 | B2 | 12/2017 | McCarthy |
| 10,102,767 | B2 | 10/2018 | Bayadzhan |
| 10,446,048 | B2 | 10/2019 | Wang |
| 10,509,529 | B2 | 12/2019 | Decker |
| 2012/0055319 | A1 | 3/2012 | Lin |
| 2014/0260898 | A1 | 9/2014 | Bales et al. |
| 2019/0304424 | A1 | 10/2019 | Katsuta |

FOREIGN PATENT DOCUMENTS

| | | | |
|---|---|---|---|
| JP | H10247059 | A | 9/1998 |
| JP | 2000126460 | A | 5/2000 |
| JP | 3239615 | B2 | 12/2001 |
| JP | 2005084069 | A | 3/2005 |
| JP | 2005265903 | A | 9/2005 |
| JP | 2014077965 | A | 5/2014 |

OTHER PUBLICATIONS

Written Opinion issued in Intl. Appln. No. PCT/JP2018/008100 dated May 22, 2018.
International Search Report issued in Intl. Appln. No. PCT/JP2018/008101 dated May 22, English translation provided.
Written Opinion issued in Intl. Appln. No. PCT/JP2018/008101 dated May 22, 2018.
International Search Report issued in Intl. Appln. No. PCT/JP2018/008102 dated May 1, 2018. English translation provided.
Written Opinion issued in Intl. Appln. No. PCT/JP2018/008102 dated May 1, 2018.
Copending U.S. Appl. No. 16/522,813, filed Jul. 26, 2019 (a copy is not included because the cited application is not yet available to the public and the Examiner has ready access to the cited application).
Copending U.S. Appl. No. 16/522,805, filed Jul. 26, 2019 (a copy is not included because the cited application is not yet available to the public and the Examiner has ready access to the cited application).
Notice of Allowance issued in U.S. Appl. No. 16/522,805 dated Feb. 28, 2020.
Notice of Allowance issued in U.S. Appl. No. 16/522,813 dated Mar. 2, 2020.
English translation of Written Opinion issued in Intl. Appln. No. PCT/JP2018/008100 dated May 22, 2018, previously cited in IDS filed Jul. 26, 2019.
International Preliminary Report on Patentability issued in Intl. Appln. No. PCT/JP2018/008100 dated Sep. 12, 2019. English translation provided.
English translation of Written Opinion issued in Intl. Appln. No. PCT/JP2018/008101 dated May 22, 2018, previously cited in IDS filed Jul. 26, 2019.
International Preliminary Report on Patentability issued in Intl. Appln. No. PCT/JP2018/008101 dated Sep. 12, 2019. English translation provided.
English translation of Written Opinion issued in Intl. Appln. No. PCT/JP2018/008102 dated May 1, 2018, previously cited in IDS filed Jul. 26, 2019.
International Preliminary Report on Patentability issued in Intl. Appln. No. PCT/JP2018/008102 dated Sep. 12, 2019. English translation provided.
Office Action issued in Japanese Appln. No. 2017-040599 dated Oct. 23, 2019. English machine translation provided.
Office Action issued in U.S. Appl. No. 16/522,813 dated Jun. 15, 2020.
Notice of Allowance issued in U.S. Appl. No. 16/522,805 dated May 6, 2020.
Office Action issued in Japanese Appln. No. 2017-040599 dated Apr. 21, 2020. English translation provided.
Notice of Allowance issued in U.S. Appl. No. 16/522,805 dated Jul. 28, 2020.

* cited by examiner

| CHORDS | LOWER KEY PITCHES (LOW → HIGH) |
|---|---|
| C | G, C, E |
| G | G, B, D |
| G7 | G, B, F |
| F | A, C, F |
| Am | A, C, E |
| Dm | A, D, F |
| E7 | G#, D, E |
| Em | G, B, E |
| C7 | G, B♭, C |
| B♭ | F, B♭, D |

PERFORMANCE ASSISTANCE APPARATUS AND METHOD

CROSS REFERENCE TO RELATED APPLICATIONS

This application is a continuation of PCT International Application No. PCT/JP2018/008102, filed Mar. 2, 2018, which claims priority under 35 U.S.C. § 119 from Japanese Patent Application No. JP PA 2017-040599, filed Mar. 3, 2017, the entire disclosure of which are herein incorporated by reference.

BACKGROUND

The embodiments of the present invention relate to a performance assistance apparatus and method suited for training of a music performance.

There have heretofore been known electronic musical instruments that have a guide function for guiding a user or human player in a music performance. Such electronic musical instruments have a fingering display device applied thereto. The electronic keyboard musical instrument includes a pair of upper and lower rows of LEDs (Light Emitting Diodes) provided in corresponding relation to individual keys of the keyboard. The LEDs in the upper row indicate positions of an index finger, middle finger, and ring finger, and the LEDs in the lower row indicate positions of a thumb and little finger. A user can intuitively know or identify the respective positions of the five fingers by the LEDs.

SUMMARY

Some of the existing electronic musical instruments include, in addition to a manual keyboard operable with hands, a pedal keyboard operable with feet, as typified by electronic organs. The pedal keyboard includes a plurality of pedal keys having different pitches (sound pitches) assigned respectively thereto. In order to enable a user to improve his or her skill for performing the pedal keyboard, it is required to provide the user with a performance guide for the pedal keyboard in addition to a performance guide for the manual keyboard. However, the pedal keyboard is located more remote from the eyes of the user than the manual keyboard. Thus, even in a case where the performance guide for the pedal keyboard is provided using LEDs in a similar manner to the performance guide for the manual keyboard, it may be difficult for the user to appropriately know or identify pedal keys to be operated by the user. If the LEDs for the pedal keyboard are provided at positions near the user's eyes, for example, the LEDs and the pedal keyboard are spaced from each other by a relatively great distance, and it may be difficult for the user to associate illuminated LEDs and pedal keys to be operated. If the LEDs for the pedal keyboard are provided at positions near the pedal keyboard, on the other hand, it may be difficult for the user to look at the LEDs.

In some cases, a chord score having chord names and the like indicated thereon is used. In such a case, chords and bass notes corresponding to the chords are performed, for example, by a user or human player operating a manual keyboard with the left hand and operating a pedal keyboard with the feet. However, for a human player who does not have sufficient knowledge of chords or is unfamiliar with a chord score, it is difficult to associate chords indicated on the chord score and manual and pedal keys to be operated.

In view of the foregoing prior art problems, it is one of the objects of the present invention to provide a performance assistance apparatus and method which can assist a human player in performing a foot operator group by use of a structure that is easy for the human player to look at and operate and thereby enables the human player to effectively improve his or her skill for performing the foot operator group.

In order to accomplish the aforementioned and other objects, the inventive performance assistance apparatus is suited for application to a performance apparatus provided with a foot operator group including a plurality of foot operators that are operable with a foot of a human player and that have different pitches (namely, sound pitches) assigned respectively thereto, and the inventive performance assistance apparatus includes: a storage medium storing a program; and a processor for executing the program, the processor, when executing the program, configured to: cause a display device to display a foot operator image indicative of the foot operator group; acquire chord information indicative of a chord to be performed; identify a pitch of a bass note corresponding to the chord indicated by the acquired chord information; and visually designate, on the foot operator image displayed on the display device, a particular foot operator corresponding to the identified pitch of the bass note.

According to the inventive performance assistance apparatus constructed in the aforementioned manner, the foot operator image indicative of the foot operator group is displayed on the display device, the pitch of the bass note corresponding to the chord to be performed is identified on the basis of the chord information indicative of the chord to be performed, and the particular foot operator corresponding to the identified pitch of the bass note is visually designated (specified). In this manner, the display device can be disposed at a position easy for the human player to look at, without being constrained by a physical position of the foot operator group (such as a pedal keyboard). Thus, the inventive performance assistance apparatus can assist the human player in performing the foot operator group, with a structure easy for the human player to look at. Further, because the inventive performance assistance apparatus can provide appropriate chord-based assistance for performing the foot operator group, the inventive performance assistance apparatus can assist the human player in performing the foot operator group by use of a structure that is easy for the human player to look at and operate.

The disclosure made herein also embraces a method that includes steps corresponding to the constituent elements of the inventive performance assistance apparatus set forth above. The method may be arranged and carried out as a computer-implemented method. Also disclosed herein is a computer-readable, non-transitory storage medium storing a program executable by one or more processors for performing the aforementioned method.

BRIEF DESCRIPTION OF DRAWINGS

Certain embodiments of the present invention will hereinafter be described in detail, by way of example only, with reference to the accompanying drawings, in which.

DETAILED DESCRIPTION

Construction of Electronic Musical Instrument

Figure 1:
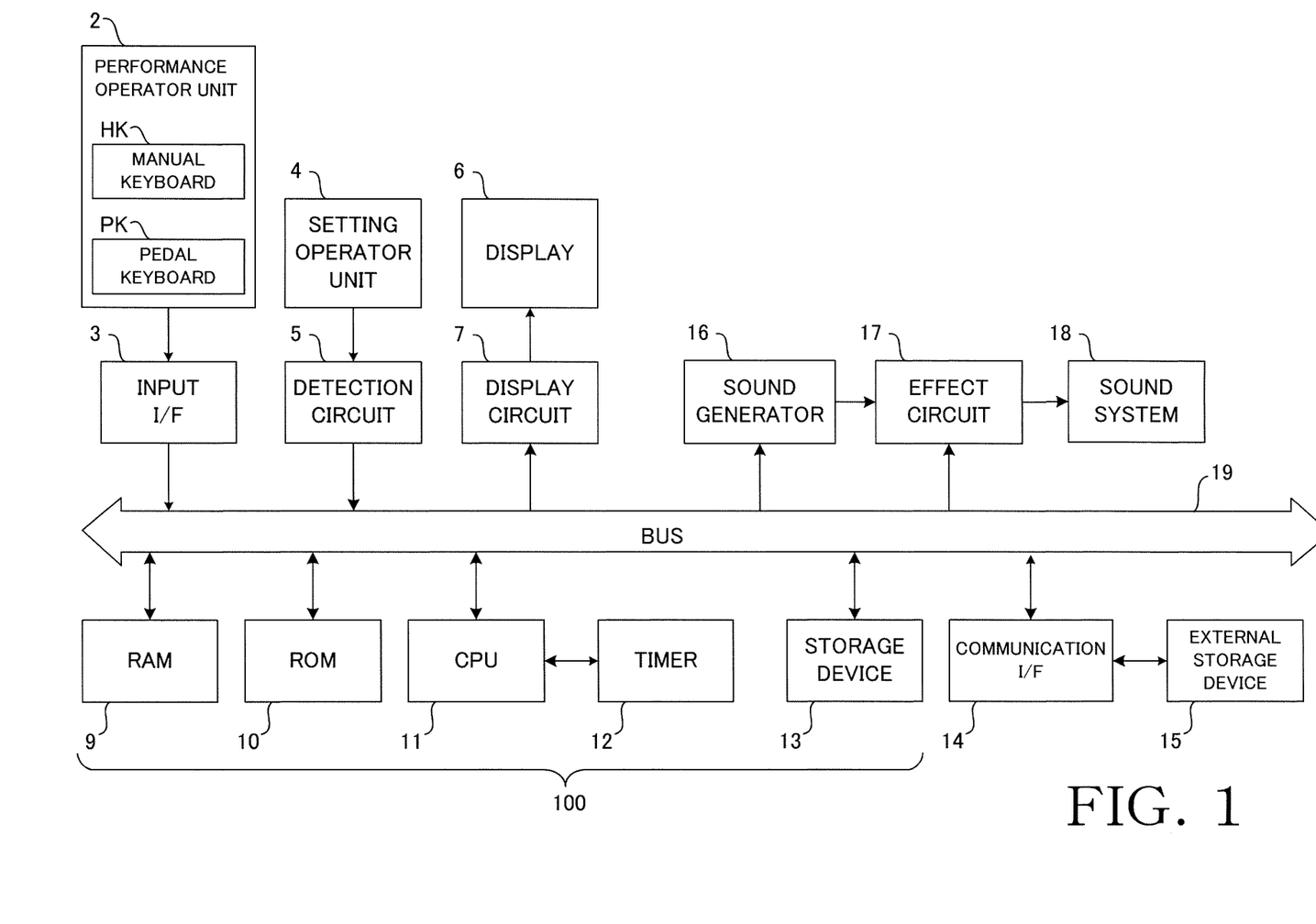
FIG. 1 is a block diagram illustrating an example of a hardware construction of an electronic musical instrument provided with an embodiment of the inventive performance assistance apparatus.

FIG. 1 is a block diagram illustrating an example of a hardware construction of an electronic musical instrument 1 provided with an embodiment of the inventive performance assistance apparatus 100. The electronic musical instrument 1 of FIG. 1 is an electronic keyboard musical instrument capable of performing music pieces. As an operation mode of the electronic musical instrument 1, a training mode is available for executing music performance training by use of a function of the performance assistance apparatus 100 incorporated in the electronic musical instrument 1.

The electronic musical instrument 1 includes a performance operator unit 2, an input I/F (interface) 3, a setting operator unit 4, a detection circuit 5, a display 6, and a display circuit 7. The performance operator unit 2 is connected to a bus 19 via the input I/F 3. Performance data are input to the electronic musical instrument 1 by a user operating the performance operator unit 2. The performance data are, for example, in the form of MIDI (Musical Instrument Digital Interface) data or audio data. In the illustrated example, the performance operator unit 2 includes a manual keyboard HK (manual operator group) suited for operation with user's (human player's) hands and a pedal keyboard PK (foot operator group) suited for operation with a foot or feet of the user. Details of the manual keyboard HK and pedal keyboard PK will be set forth later. In addition to the manual keyboard HK and pedal keyboard PK, a modulation wheel, a pitch bend wheel, etc. may be provided in the performance operator unit 2.

The setting operator unit 4 includes an ON/OFF operation switch, a rotationally operable rotary encoder or a slidingly operable linear encoder, and the like, and this setting operator unit 4 is connected to the bus 19 via the detection circuit 5. The setting operator unit 4 is used to execute sound volume adjustment, turning-ON/OFF of a power supply, and various other setting operations. The display 6 is a display device generally known as a peripheral device of a computer or the like and includes a flat screen having a necessary and sufficient area. The display 6 includes, for example, a liquid crystal display and is connected to the bus 19 via the display circuit 7. Various information related to a performance, settings, and the like is displayed on the display 6. At least portions of the setting operator unit 4 and display 6 may be constituted by a touch panel display. As generally known, the display 6 is disposed at a position (for example, at an eye level position) that is easy for the user (human player) to look at. Namely, the position of the display 6 is not constrained by a physical position of the pedal keyboard PK.

The electronic musical instrument 1 further includes a RAM (Random Access Memory) 9, a ROM (Read-Only Memory) 10, a CPU (Central Processing Unit) 11, a timer 12, and a storage device 13. The RAM 9, ROM 10, CPU 11, and storage device 13 are connected to the bus 19, and the timer 12 is connected to the CPU 11. External equipment, such as an external storage device 15, may be connected to the bus 19 via a communication I/F (interface) 14. The RAM 9, ROM 10, CPU 11, and timer 12 together constitute a computer.

The RAM 9, which is for example a volatile memory, is used as a working area for the CPU 11 but also temporarily stores various data. The ROM 10, which is for example a non-volatile memory, has stored therein computer programs (application programs), such as control programs and the performance assistance program. The CPU 11 performs later-described performance training processing by executing on the RAM 9 the training program stored in the ROM 10. The timer 12 gives time information, such as a current time, to the CPU 11.

The storage device 13 includes any of storage media, such as a hard disk, an optical disk, a magnetic disk, and a memory card, to store music piece data sets of a plurality of practice music pieces. Each of the music piece data sets includes at least a plurality of chord information indicative of a chord progression in the music piece. Each of the music piece data sets may include note train information indicative of a melody of the music piece and include note train information indicative of accompaniment notes of the music piece.

The aforementioned performance assistance program may be stored in the storage device 13. Similarly to the storage device 13, the external storage device 15 includes any of storage media, such as a hard disk, an optical disk, a magnetic disk, and a memory card. The aforementioned performance assistance program may be stored in the external storage device 15.

The performance assistance program may be stored in a computer-readable storage medium and supplied in the storage medium to be installed into the ROM 10 or storage device 13. Further, in a case where the communication I/F 14 is connected to a communication network, the performance assistance program delivered from a server connected to the communication network may be installed into the ROM 10 or storage device 13. Similarly, at least one of the music piece data sets may be acquired from a storage medium or acquired from a server connected to the communication network.

The electronic musical instrument 1 further includes a sound generator 16, an effect circuit 17, and a sound system 18. The sound generator 16 and effect circuit 17 are connected to the bus 19, and the sound system 18 is connected to the effect circuit 17. The sound generator 16 generates tone signals on the basis of performance data input via the performance operator unit 2. The effect circuit 17 imparts acoustic effects to the tone signals generated by the sound generator 16.

The sound system 18 includes a digital-to-analog (D/A) conversion circuit, an amplifier, and a speaker. The sound system 18 converts into an analog sound signal a tone signal supplied from the sound generator 16 via the effect circuit 17 and generates a sound based on the analog sound signal. The electronic musical instrument 1 as a whole functions as a performance apparatus that generates a tone in response to a user's performance operation on the performance operator unit 2. Further, in the electronic musical instrument 1, the display 6, RAM 9, ROM 10, CPU 11, and storage device 13 mainly function as the performance assistance apparatus 100.

Performance Operator Unit

Figure 2:
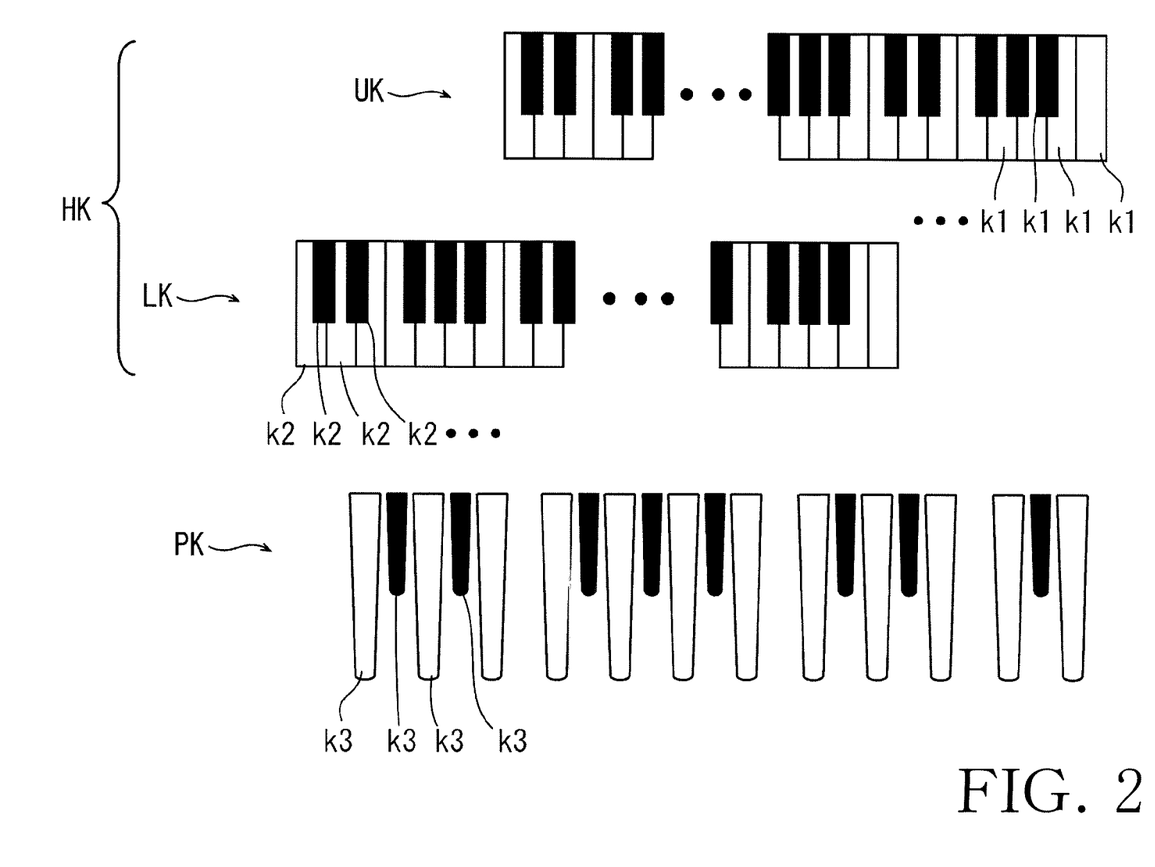
FIG. 2 is a schematic diagram explanatory of a specific example of each of a manual keyboard and a pedal keyboard that constitute a performance operator unit.

FIG. 2 is a schematic diagram explanatory of a specific example of each of the manual keyboard HK and pedal keyboard PK constituting the performance operator unit 2 and the guide section 8. As illustrated in FIG. 2, the manual keyboard HK includes an upper keyboard UK (first manual operator group) and a lower keyboard LK (second manual operator group). The upper keyboard UK and lower keyboard LK are positionally displaced from each other in an up-down direction and in a front-rear direction. More specifically, the upper keyboard UK is located above the lower keyboard LK and rearward of the lower keyboard LK (namely, located more remote from the user than the lower keyboard LK). The upper keyboard UK is suited mainly for operation with the user's right hand, while the lower keyboard LK is suited mainly for operation with the user's left hand. The upper keyboard UK includes a plurality of upper keys k1 having different pitches assigned respectively thereto, and the lower keyboard LK includes a plurality of lower keys k2 having different pitches assigned respectively thereto. The pedal keyboard PK includes a plurality of pedal keys k3 having different pitches assigned respectively thereto. Hereinafter, the upper keys k1 and lower keys k2 will be referred to collectively as manual keys.

The upper keyboard UK includes, for example, forty-nine upper keys k1 (namely, four octaves and one note) or sixty-one upper keys k1 (namely, five octaves and one note). Similarly to the upper keyboard UK, the lower keyboard LK includes forty-nine or sixty-one lower keys k2. The pedal keyboard PK includes, for example, twenty pedal keys k3 (namely, one octave and eight notes) or twenty-five pedal keys k3 (namely, two octaves and one note). Generally, the lowest pitch in the pitch range of the lower keyboard LK is higher than the lowest pitch in the pitch range of the pedal keyboard PK, and the lowest pitch in the pitch range of the upper keyboard UK is higher than the lowest pitch in the pitch range of the lower keyboard LK. Further, the pitch range of the pedal keyboard PK is narrower than the pitch range of each of the upper keyboard UK and lower keyboard LK. The respective pitch ranges of the upper keyboard UK, lower keyboard LK, and pedal keyboard PK may be set in advance or may be set as desired by the user.

A guide section for providing a performance guide may be provided in corresponding relation to at least one of the upper keyboard UK and lower keyboard LK. For example, a plurality of LEDs (light emitting diodes) corresponding to the plurality of upper keys k1 may be provided as the guide section on a rear panel surface portion of the upper keyboard UK. Any one of the LEDs is illuminated at a time point when the corresponding upper key k1 should be operated. In this way, the user can easily know or identify the operating time point or timing of each of the upper keys k1. Similarly, a plurality of LEDs corresponding to the plurality of lower keys k2 may be provided.

Training Screen

In the present example, one of the plurality of practice music pieces prepared in advance is selected by the user in the training mode. The user performs accompaniment notes of the selected music piece on the lower keyboard LK and pedal keyboard PK while performing the melody of the selected music piece on the upper keyboard UK.

Figure 3:
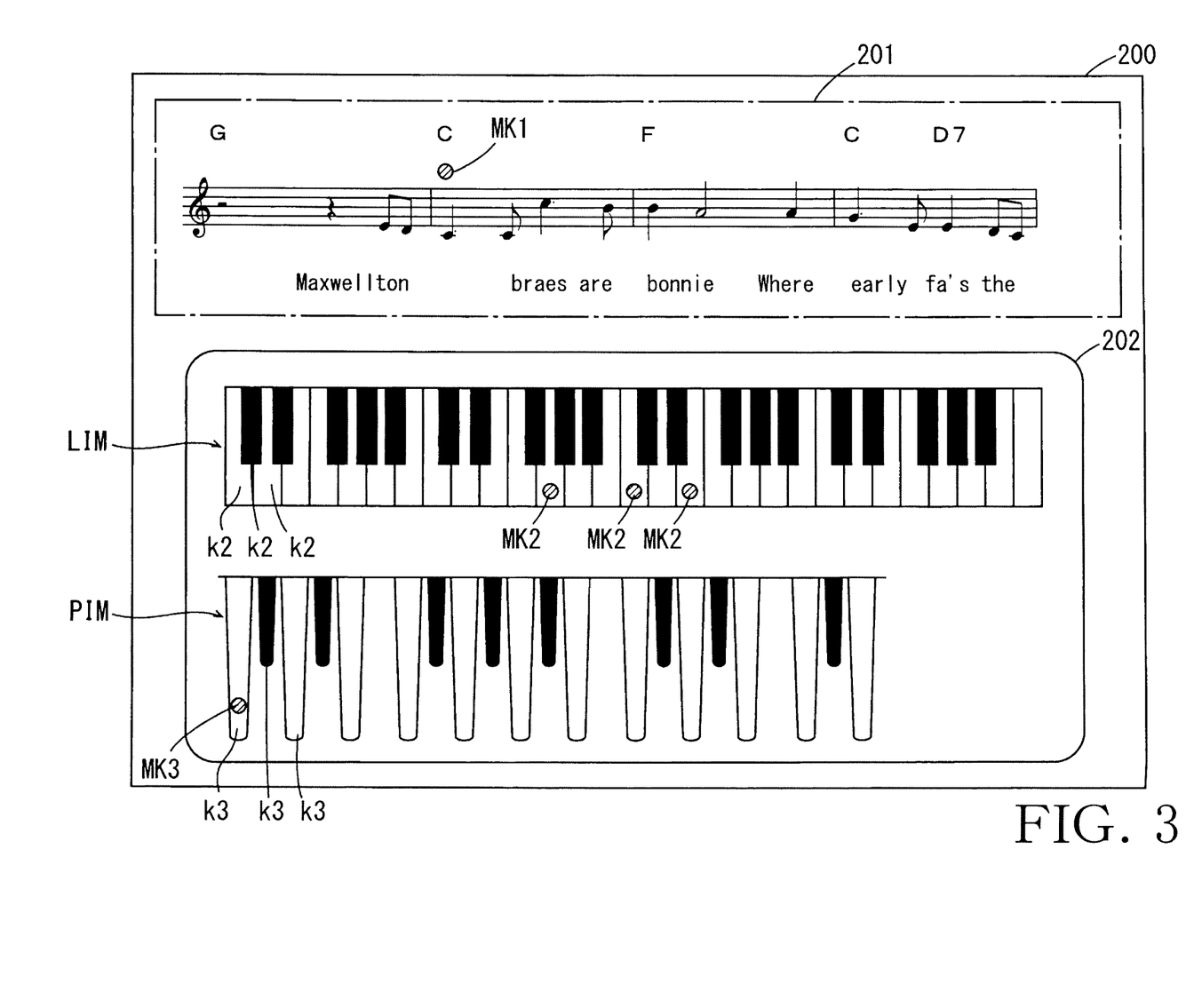
FIG. 3 is a diagram illustrating an example of a training screen displayed on a display.

A training screen for guiding the user in performing the lower keyboard LK and pedal keyboard PK is displayed on the display 6 of FIG. 1. FIG. 3 is a diagram illustrating an example of the training screen 200 displayed on the display 6. In FIG. 3, the training screen 200 includes a score display region 201 and a keyboard image display region 202.

A musical score of at least a section of the selected music piece is displayed on the score display region 201. In the present example, such a musical score is displayed per predetermined unit section of the selected music piece. This musical score includes at least characters indicative of individual chords in a chord progression. Here, the characters indicative of chords include alphabetical letters and numbers indicating chord names or degree names. A plurality of types of musical scores may be prepared in advance in such a manner that a particular type of musical score selected by the user from among the plurality of types of musical scores can be displayed. The types of musical scores prepared in advance include, for example, a chord score that includes characters indicative of chords and measure lines, a one-row musical score that includes a note train of a melody in addition to characters indicative of chords (such as a musical score including, on a treble staff, characters indicative of corresponding chords), a musical score that includes, on a grand staff including note trains of a melody and an accompaniment, characters indicative of corresponding chords. In the illustrated example of FIG. 3, the musical score is a one-row musical score that includes chord names and a note train of a melody. Further, in the illustrated example of FIG. 3, lyrics of a selected music piece is displayed together with the musical score. Arrangements may be made for enabling the user to select whether the lyrics should be displayed or not.

A marker MK1 indicative of a current position in a music piece may be displayed on a musical score that is displayed on the score image display region 201. In the illustrated example of FIG. 3, a measure including the current position in the music piece is indicated by the marker MK1 of a circular shape. The displayed position of the marker MK1 changes in accordance with a progression of the music piece. Once the current position arrives at the end position of the currently displayed unit section of the music piece, a musical score of the next unit section is displayed. Arrangements may be made for enabling the user to select whether the marker MK1 should be displayed or not. Alternatively, the musical score to be displayed may be updated every time the music piece progresses by one measure in such a manner that the first measure of each displayed musical score always includes the current position.

On the keyboard image display region 202 are displayed a lower keyboard image LIM (manual operator image) corresponding to the lower keyboard LK (second manual operator group) of FIG. 2 and a pedal keyboard image PIM (foot operator image) corresponding to the pedal keyboard PK of FIG. 2. The lower keyboard image LIM and pedal keyboard image PIM of FIG. 3 correspond respectively to the lower keyboard LK of forty-nine keys and pedal keyboard PK of twenty keys.

In accordance with a progression of the music piece, the lower keys k2 to be operated are sequentially designated on the lower keyboard image LIM, and the pedal keys k3 to be operated are sequentially designated on the pedal keyboard image PIM. In the present example, a circular marker MK2 is additionally displayed on each of the lower keys k2 to be operated, and a circular marker MK3 is additionally displayed on each of the pedal keys k3 to be operated. Note that arrows or the like pointing to the lower and pedal keys k2 and k3 to be operated may be additionally displayed in place of the markers MK2 and MK3. In short, in order to designate (or highlight or provide a visual guide for) each lower key k2 or pedal key k3 to be operated, it suffices that a particular icon be additionally displayed in relation to the image of the lower key k2 or pedal key k3 to be operated. As another example, a display style of the image of the lower key k2 or pedal key k3 to be operated may itself be changed, without being limited to the addition of such a particular icon, in order to designate (or highlight or provide a visual guide for) the lower key k2 or pedal key k3. For example, a color of the image of the lower key k2 or pedal key k3 to be operated may be changed, or the image of the lower key k2 or pedal key k3 to be operated may be displayed in a blinking manner.

To summarize the foregoing description, in the illustrated example of FIG. 3, the foot operator image (pedal keyboard image PIM) and displays or objects indicative of chord names (images of characters indicative of chords on the score display region 201) are displayed together on a same display screen of the display 6 (display device). In this way, it is possible to achieve the advantageous benefit that a correspondence relationship between a particular pedal key k3 (foot operator) and a chord name corresponding to the particular pedal key k3 can be grasped or identified at a glance. More specifically, as illustrated in FIG. 3, one or more objects indicative of one or more chord names that correspond to a chord progression over a particular performance section (such as four measures) including a note corresponding to the particular foot operator designated visually are displayed simultaneously on the display 6 (display device), and a display object (marker MK1) highlighting each object indicative of a particular chord name is added as the performance progresses. Further, visual designation (namely, designation by the marker MK3) of the particular foot operator is executed on the pedal keyboard image PIM (foot operator image) in synchronism with the display object (marker MK1) highlighting the object indicative of a particular chord name. In this way, it is possible to achieve the advantageous benefit that a correspondence relationship between the particular pedal key k3 (foot operator) to be operated and the chord name corresponding to the particular pedal key k3 can be identified even more easily at a glance.

Identification of Pitch

Hereinafter, a pitch corresponding to a pedal key k3 to be operated will be referred to as "pedal key pitch", and a pitch corresponding to a lower key k2 to be operated will be referred to as "lower key pitch". In the present example, a bass pitch of a chord in a music piece is identified as a pedal key pitch, and at least one of pitches of a plurality of notes constituting the chord (hereinafter referred to as "chord note pitches") in the music piece is identified as a lower key pitch. In the present embodiment, a composition of lower key pitches corresponding to a chord is determined on the basis of identifying pitches of one or more notes included in notes constituting the chord. In this case, such pitches of one or more notes included in notes constituting a chord and a composition of lower key pitches (lower key pitch composition) corresponding to the chord are identified generally in accordance with a chord concept called "basic form" or "inversion form". According to the present embodiment, for each type of chord of which the normal number of chord pitches is three or more (such as a tetrad), the number of lower key pitches corresponding to the chord is limited to three or less, as will be described later. Thus, in this specification, the "inversion form" means inverting the pitch order of the lower key pitches limited to three or less (namely, lowering each of the pitches other than the root below the pitch of the root).

Figure 4:
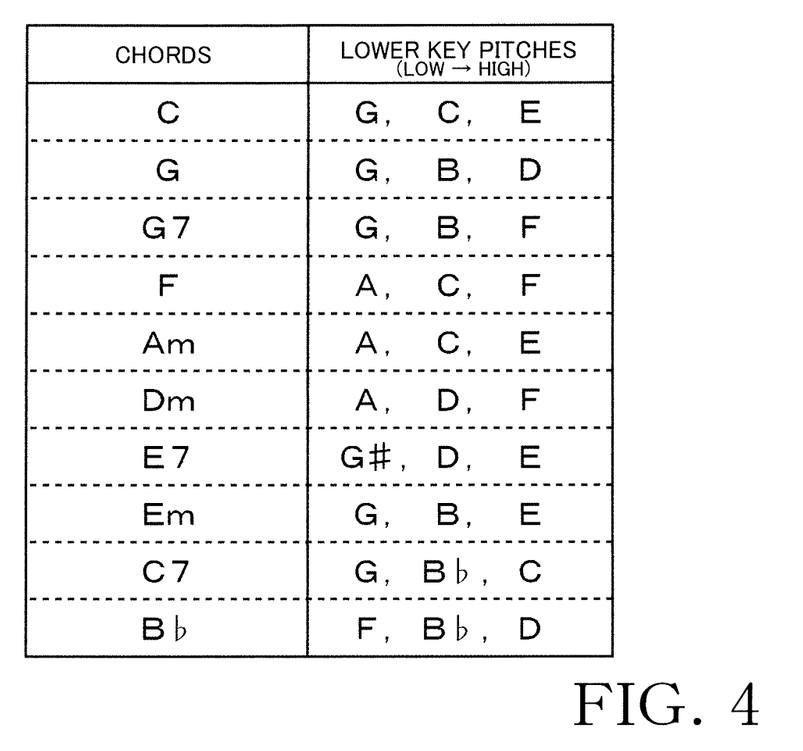
FIG. 4 is a diagram illustrating an example of a correspondence relationship between individual chords and lower key pitches.

A correspondence relationship between individual chords and compositions of lower key pitches corresponding to the chords may be prestored in the storage device 13. In such a case, the composition of the lower key pitches per chord is identifiable on the basis of the correspondence relationship prestored in the storage device 13. FIG. 4 illustrates an example of such a correspondence relationship between individual chords and compositions of lower key pitches. In FIG. 4, the chords are indicated by their respective chord names, and each of the compositions of lower key pitches corresponding to the chords is indicated sequentially in a low-to-high pitch order. In the illustrated example of FIG. 4, it is assumed that each of the chords is composed of three constituent notes (three lower key pitches), irrespective of whether the chord is a triad, tetrad, or the like. Each of the compositions of lower key pitches corresponding to the chords is determined by identifying pitches of one or more notes (as an example, pitches of three constituent notes) included in the notes constituting the chord on the basis of the basic form or inversion form of the chord as noted above. For example, the composition of lower key pitches corresponding to triad chord "G" (G major chord) is "G", "B", and "D" in the low-to-high pitch order and is represented in the basic form of the G major chord. The composition of lower key pitches corresponding to chord "C" (C major chord) is "G", "C", and "E" in the low-to-high pitch order and is represented in the second inversion form of the C major chord. Further, in the present example, it is assumed that the composition of lower key pitches corresponding to a tetrad, on the other hand, is composed of three pitches including pitches of the third and seventh degrees of the chord. For example, the composition of lower key pitches corresponding to chord "E7" (E dominant seventh chord) is "G #", "D", and "E" in the low-to-high pitch order. Note that the lower key pitches corresponding to a same chord may differ depending on the key of the music piece. For example, the composition of lower key pitches corresponding to a same triad may be determined in accordance with an inversion form differing depending on the key of the music piece.

A plurality of correspondence relationships similar to that illustrated in FIG. 4 may be prepared in advance (prestored in the external storage device 13) in such a manner that a pitch order pattern of lower key pitches of each chord may be identified on the basis of one correspondence relationship selected by the user from among the plurality of correspondence relationships. Further, a correspondence relationship between chords and lower key pitches may be set as desired by the user. Alternatively, the composition of lower key pitch may be identified on the basis of a predetermined algorithm, rather than on the basis of the correspondence relationship prestored in the storage device 13.

As an example, each of the compositions of lower key pitches corresponding to individual chords may be determined on the basis of the basic form or inversion form in such a manner that the lowest one of the lower key pitches of the chord is included within a predetermined range. Namely, the composition of lower key pitches may be determined in such a manner that the lowest one of respective pitches of a plurality of notes (three notes) constituting the lower key pitches is included within the predetermined range. The predetermined range may be a fixed range or may be changed as desired by the user. In the illustrated example of FIG. 4, it is assumed that the above-mentioned predetermined range is set between pitch name "F #" and pitch name "B" that is five halftones higher than "F #". If represented by an absolute pitch, the predetermined range is set, for example, between pitch name "F #2" and pitch name "B2". Here, the value "2" represents an octave range, and "C3" represents the center "C" ("do") of a grand staff. Namely, "F #2" and "B2" are pitches within the same octave range. Namely, by determining the composition of lower key pitches in such a manner that the lowest one of the lower key pitches corresponding to a chord is included within the predetermined range, the lower key pitches corresponding to different chords get closer to one another among the chords. Thus, if the user performs the lower key pitches in accordance with the lower key pitch compositions, the user can easily perform the lower keys k2 (lower key pitches) corresponding to chord pitches of different chords. Further, when different chords are to be performed sequentially in accordance with a chord progression, a width of changes in the lower key pitches of individual chords to be performed can be reduced, and thus, the user can perform the chord pitches with a natural flow. Note that the above-mentioned predetermined range may be made different depending on the key of the music piece; rather, the predetermined range may be set at a different absolute pitch range depending on the key of the music piece.

Because each pedal key pitch is a bass pitch of a chord, it can be uniquely identified unambiguously from each chord. Here, a bass pitch of an ordinary chord that is not a fraction chord (or slash chord, or on chord) is a pitch of the root of the chord. A bass pitch of a fraction chord (or slash chord, or on chord), on the other hand, is the lowest pitch indicated by an alphabetical letter of a denominator. For example, a bass pitch (namely, bass-designating note) of fraction chord "G/B" is "B" as the lowest pitch. Note that a correspondence relationship between individual chords and pedal key pitches may be prestored in addition to a correspondence relationship between individual chords and lower key pitches similar to that illustrated in FIG. 4.

Figure 5A:
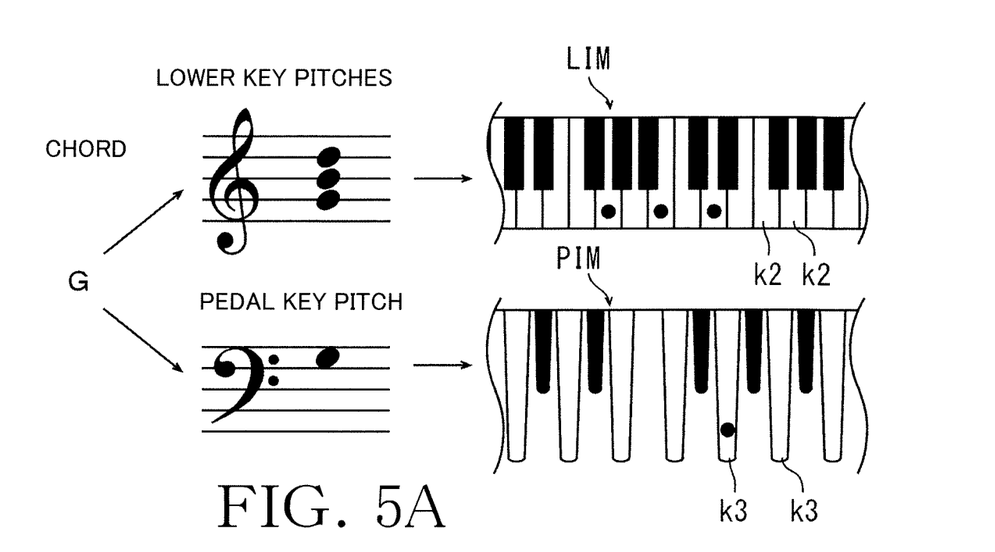
FIGS. 5A and 5B are diagrams explanatory of designation of a lower key on a lower keyboard image and designation of a pedal key on a pedal keyboard image.
Figure 5B:
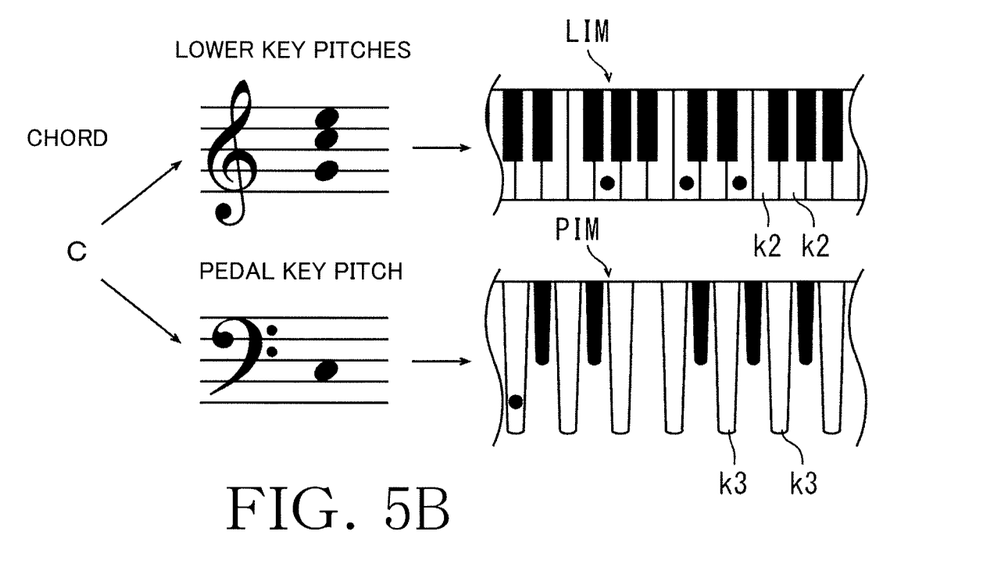

FIGS. 5A and 5B are diagrams explanatory of designation of a lower key k2 on the lower keyboard image LIM and designation of a pedal key k3 on the pedal keyboard image PIM. G major chord is illustrated in FIG. 5A. In this case, a lower key pitch composition of "G", "B", and "D" in the low-to-high order (which is the basic form of G major chord) is determined, for example, on the basis of the correspondence relationship of FIG. 4. Further, "G" that is the root of the chord is determined as the pedal key pitch (pitch of the bass note). In this manner, the lower keys k2 corresponding to "G", "B", and "D" in the low-to-high order are designated on the lower keyboard image LIM, and the pedal key k3 corresponding to "G" is designated on the pedal keyboard image PIM. Further, C major chord is illustrated in FIG. 5B. In this case, a lower key pitch composition of "G", "C", and "E" in the low-to-high order (second inversion form of C major chord) is determined, for example, on the basis of the correspondence relationship of FIG. 4, and "C" that is the root of the chord is determined as the pedal key pitch (pitch of the bass note). In this manner, the lower keys k2 corresponding to "G", "C", and "E" in the low-to-high order are designated on the lower keyboard image LIM, and the pedal key k3 corresponding to "C" is designated on the pedal keyboard image PIM. Namely, in the present embodiment, although the lowest pitch of the lower key pitches of each chord can be a pitch other than the bass pitch of the chord depending on the lower key pitch composition, the pitch of the bass note identified in accordance with the chord is made the bass pitch (root pitch or the lowest pitch of a fraction chord). Needless to say, the pitch of the bass note identified in accordance with the chord is lower in absolute pitch than the pitch of the lowest note of the chord.

Functional Configuration

Figure 6:
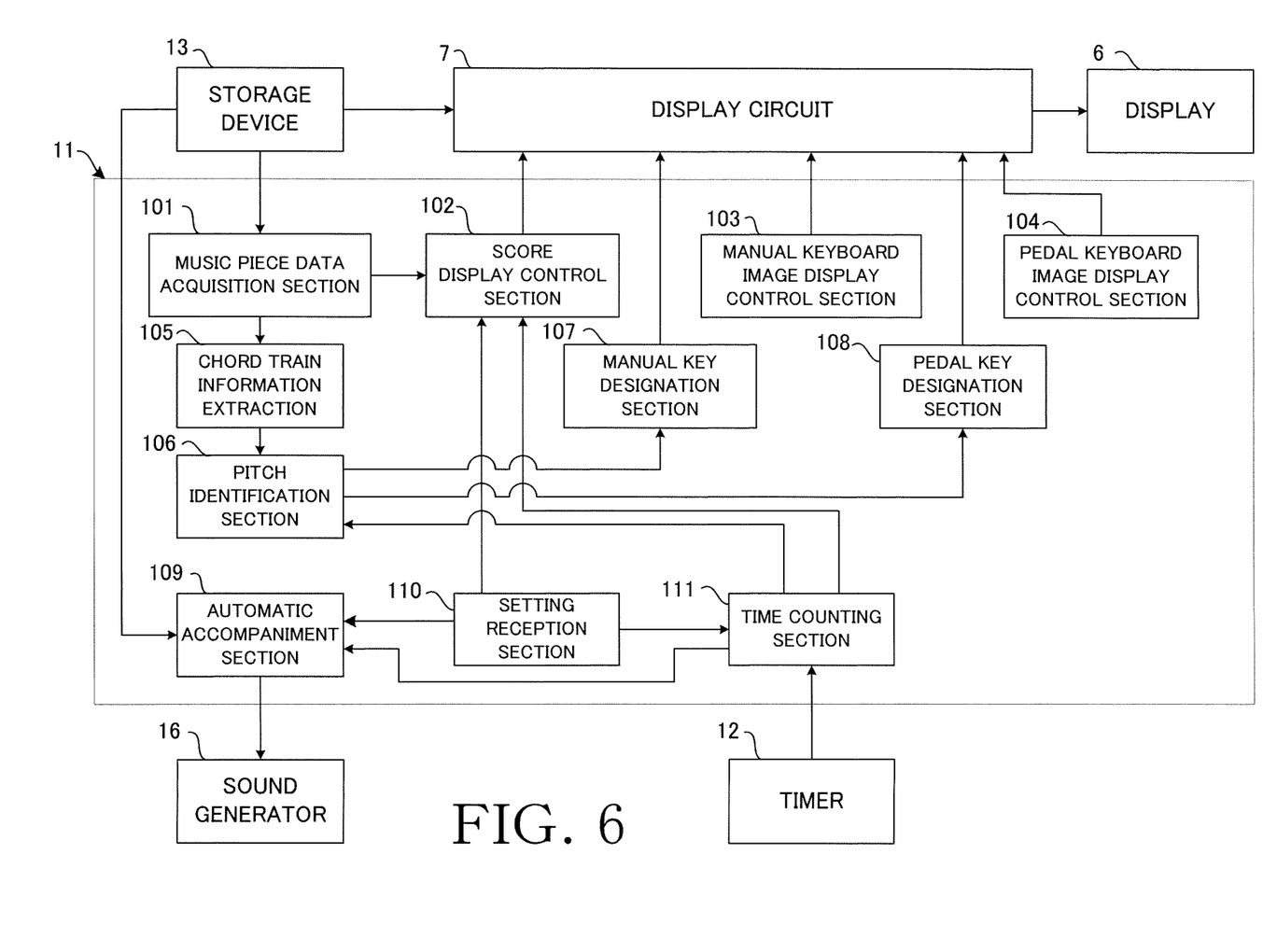
FIG. 6 is a block diagram illustrating a functional configuration of the performance assistance apparatus.

FIG. 6 is a block diagram illustrating a functional configuration of the performance assistance apparatus 100. Functions of various sections of the performance assistance apparatus 100 illustrated in FIG. 6 are performed by the CPU 11 of FIG. 1 executing the training program stored in the ROM 10 or storage device 13. As illustrated in FIG. 6, the performance assistance apparatus 100 includes a music piece data acquisition section 101, a score display control section 102, a manual keyboard image display control section 103, a pedal keyboard image display control section 104, a chord train information extraction section 105, a pitch identification section 106, a manual key designation section 107, a pedal key designation section 108, an automatic accompaniment section 109, a setting reception section 110, and a time counting section 111.

The music piece data acquisition section 101 acquires a music piece data set of a music piece selected by the user from among the plurality of music piece data sets stored in the storage device 13. The score display control section 102 controls the display circuit 7 on the basis of the acquired music piece data to thereby display on the display 6 a musical score including at least chords. As noted above, such a musical score is displayed on the score display region 201 of the training screen 200 (FIG. 3). The score display control section 102 may display a musical score of a type selected by the user.

The manual keyboard image display control section 103 controls the display circuit 7 to display on the display 6 a manual keyboard image corresponding to at least a portion of the manual keyboard HK. In the present example, the lower keyboard image LIM corresponding to the lower keyboard LK of FIG. 2 is displayed as the manual keyboard image. The pedal keyboard image display control section 104 controls the display circuit 7 to display on the display 6 a pedal keyboard image corresponding to the pedal keyboard PK of FIG. 2. As noted above, the lower keyboard image LIM and pedal keyboard image PIM are displayed on the keyboard image display region 202 of the training screen 200 (FIG. 3).

The chord train information extraction section 105 extracts, in accordance with a progression of a music piece (progression of an automatic performance sequence), chord train information from the music piece data acquired by the music piece data acquisition section 101. The chord train information indicates not only individual chords constituting a chord progression corresponding to the music piece but also respective start positions of the individual chords (namely, start timings, such as timings each indicative of a beat position at which any one of the chords starts). In the chord train information, each of the chords may be represented by a chord name or degree name, or by a chord number predetermined so as to distinguish the chord. On the basis of, for example, the correspondence relationship of FIG. 4, the pitch identification section 106 identifies, as lower key pitches, chord pitches of each of the chords indicated by the extracted chord train information. The pitch identification section 106 identifies a pitch of a bass note (pedal key pitch) in association with each of the chords indicated by the extracted chord train information; for example, the pitch identification section 106 identifies the bass pitch of the chord as a pedal key pitch, as noted above.

The manual key designation section 107 controls the display circuit 7 to designate on the lower keyboard image LIM lower keys k2 corresponding to the identified lower key pitches. The pedal key designation section 108 controls the display circuit 7 to visually designate on the pedal keyboard image PIM a particular pedal key k3 corresponding to the identified bass note pitch (pedal key pitch). Namely, the marker MK3 is added to the image of the particular pedal key k3, as illustrated for example in FIG. 3. In this manner, the performance assistance unique to the present invention is provided which visually guides, by use of the pedal keyboard image PIM, the user about the particular pedal key k3 to be operated in accordance with the chord for the music piece performance.

The automatic accompaniment section 109 generates output accompaniment data indicative of a note train of automatic accompaniment sounds to be output and gives the generated output accompaniment data to the sound generator 16. For example, in the storage device 13 are prestored automatic accompaniment data including accompaniment pattern data of a plurality of accompaniment parts, basic chord information, and pitch conversion rules (pitch conversion table information, pitch ranges, sound re-generation rule at the time of chord conversion, and the like). The automatic accompaniment section 109 identifies an actually performed chord on the basis of operations on the lower keyboard LK and pedal keyboard PK and generates, on the basis of the automatic accompaniment data prestored in the storage device 13, output accompaniment data corresponding to the thus-identified actually performed chord. Then, the automatic accompaniment section 109 gives the generated output accompaniment data to the sound generator 16, so that automatic accompaniment sounds corresponding to the performance operations on the lower keyboard LK and pedal keyboard PK are output from the sound generator 16. In the present embodiment, in response to the user operating a particular pedal key k3 designated on the pedal keyboard image PIM (namely, by executing a performance operation for designating a bass pitch), an automatic bass note based on the automatic accompaniment pattern is generated at a pitch corresponding to the chord identified on the basis of the performance operations on the lower keyboard LK and pedal keyboard PK.

In the present embodiment, where lower and pedal keys k2 and k3 corresponding to a chord in the music piece are designated on the lower keyboard image LIM and pedal keyboard image PIM, respectively, even a user inexperienced in chord performances can appropriately operate the lower and pedal keys k2 and k3 so as to match the chord in the music piece (model chord). Thus, as the automatic accompaniment section 109 generates and outputs automatic accompaniment sounds corresponding to the user-performed chord, appropriate automatic accompaniment sounds matching the music piece are output. Note that arrangements may be made for enabling the user to select whether automatic accompaniment sounds should be output or not.

The setting reception section 110 receives not only display settings of the training screen but also various performance settings. The display settings of the training screen include, for example, a selection of a type of a musical score to be displayed on the score display region 201, a designation of a unit section of the musical score, a selection as to whether lyrics should be displayed or not, a selection as to whether the marker MK1 should be displayed or not, and the like.

The performance settings include, for example, a designation of a color (sound color or timber) of each performance part, a designation of an initial tempo, and the like. Further, in a case where the training mode has a plurality of sub-modes, the setting reception section 110 may receive a selection of any one of the sub-modes as an initial setting. The sub-modes include, for example, a sub-mode in which the music piece does not progress until the user operates a key to be operated, a sub-mode in which the music piece progresses irrespective of a user's performance, and the like.

The time counting section 111 counts, in accordance with a progression of a music piece, a performance time on the basis of clock signals generated by the timer 12. The current position in the music piece is indicated on the basis of the time counted by the time counting section 111. Note that when a mode in which the progression of the music piece is stopped in response to a user's performance is currently selected as a sub-mode of the training mode, the time counting section 111 temporarily stops the time counting during the entire time period that the progression of the music piece is stopped.

Training Processing

Figure 7:
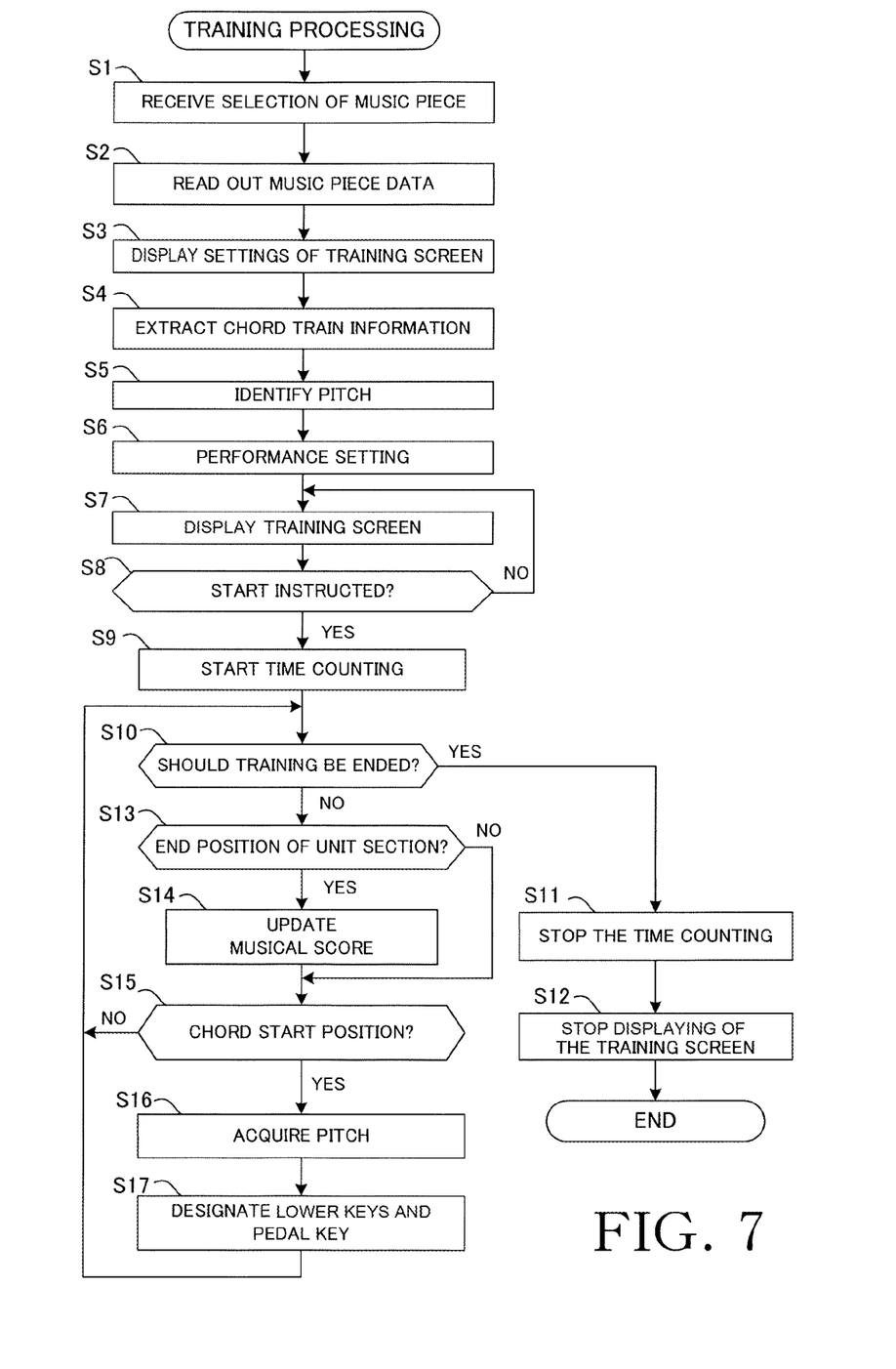
FIG. 7 is a flow chart illustrating an example of training processing.

FIG. 7 is a flow chart illustrating an example of the training processing performed by the performance assistance apparatus 100. When the training mode is selected, the training processing of FIG. 7 is performed by the CPU 11 of FIG. 1 executing the performance assistance program stored in the ROM 10 or storage device 13.

First, the CPU 11 executes the function of the music piece data acquisition section 101 to receive a selection of a music piece (step S1) and read out the music piece data set of the selected music piece (step S2). For example, once the user selects a music piece by operating the setting operator unit 4 of FIG. 1, the music piece data set of the selected music piece is read out by the function of the music piece data acquisition section 101.

Then, the CPU 11 executes the function of the setting reception section 110 to receive display settings of the training screen (step S3). Next, the CPU 11 executes the function of the chord train information extraction section 105 to extract chord train information from the music piece data set acquired at step S2 (step S4). Then, the CPU 11 executes the function of the pitch identification section 106 to identify, on the basis of the extracted chord train information, lower key and pedal key pitches corresponding to the individual chords in the music piece (step S5). The thus-identified lower key and pedal key pitches are temporarily stored into the RAM 9 or storage device 13 as performance instruction data in association with start time points of the corresponding chords. Then, the CPU 11 executes the function of the setting reception section 110 to receive various performance settings (step S6).

Next, the CPU 11 executes the functions of the score display control section 102, manual keyboard image control section 103, and pedal keyboard image control section 104 to control the display circuit 7 to display on the display 6 the training screen that includes a musical score, lower keyboard image LIM, and pedal keyboard image PIM (step S7). Once a musical score type is selected at step S3, the CPU 11 executes the function of the score display control section 102 to display a musical score of the selected type. Note that at this time point (namely, time point before the start of the training), none of the lower keys k2 and pedal keys k3 has yet been designated on the lower keyboard image LIM and pedal keyboard image PIM.

Next, the CPU 11 determines whether or not a start of the training has been instructed (step S8). For example, the setting operator unit 4 may include a start button such that the start of the training is instructed by the user operating the start button. Step S8 is repeated until the start of the training is instructed. Once the start of training is instructed, the CPU 11 executes the function of the time counting section 111 to start the time counting by the timer 12 of FIG. 1 (step S9). Further, the CPU 11 executes the function of the time counting section 111 to determine whether or not the training should be ended (step S10). For example, once an end time point of the selected music piece arrives, it is determined that the training should be ended. Alternatively, the setting operator unit 4 may include a stop button such that it is determined, in response to the user operating the end button, that the training should be ended.

When the training should be ended, the CPU 11 stops the time counting by the time counting section 111 (step S11). Further, the CPU 11 executes the functions of the score display control section 102, manual keyboard image control section 103, and pedal keyboard image control section 104 to control the display circuit 7 to stop the displaying of the training screen on the display 6 (step S12). In this manner, the training processing is brought to an end.

Upon determination at step S10 that the training should not be ended, the CPU 11 executes the function of the score display control section 102 to determine whether or not the current position in the music piece has arrived at the end position of the unit section of the music piece (step S13). Note that a length of the unit section is set at step S6 above. Upon determination at step S13 that the current position in the music piece has arrived at the end position of the unit section, the CPU 11 executes the function of the score display control section 102 to update the musical score, displayed on the training screen, with a musical score of the next unit section (step S14). If the current position in the music piece has not reached the end position of the unit section as determined at step S13, step S14 is skipped.

Then, the CPU 11 executes the function of the pitch identification section 106 to determine, on the basis of the chord train information extracted at step S4 above, to determine whether or not the current position has arrived at the start position of a chord (step S15). Upon determination at step S15 that the current position has not arrived at the start position of a chord, the CPU 11 reverts to step S10. Once the current position arrives at the start position of a chord, the CPU 11 executes the function of the pitch identification section 106 to acquire, from the performance instruction data stored in the RAM 9 or storage device 13, lower key and pedal key pitches corresponding to the current chord (step S16). Then, the CPU 11 executes the function of the manual key designation section 107 to designate lower keys k2 corresponding to the acquired lower key pitches and also executes the function of the pedal key designation section 108 to visually designate on the pedal keyboard image PIM a particular pedal key k3 corresponding to the acquired pedal key pitch (step S17). Namely, the CPU 11 imparts the marker MK3 to the image of the particular pedal key k3 and imparts the marker MK2 to the images of the lower keys k2 corresponding to the lower key pitches as illustrated for example in FIG. 3, and then the CPU 11 returns to step S10.

Advantages of Embodiment

In the present embodiment of the inventive performance assistance apparatus 100, a musical score including characters each indicative of a chord is displayed, one of the pedal keys k3 that corresponds to the bass pitch of the chord is visually designated on the pedal keyboard image PIM, and one or more of the lower keys k2 that correspond to one or more chord pitches constituting the chord are designated on the lower keyboard image LIM. Thus, by looking at the lower keyboard image LIM and pedal keyboard image PIM, the user (or human player) can intuitively know or identify the lower keys k2 and pedal key k3 to be operated. Also, the user can easily associate the chord indicated on the musical score and the to-be-operated lower keys k2 and pedal key k3 with each other. In this way, the user is enabled to easily master appropriate operations of the lower keyboard LK and pedal keyboard PK corresponding to the individual chords. As a result, the present embodiment of the inventive performance assistance apparatus 100 can appropriately assist the user (or human player) in performing the pedal keyboard PK and thereby enables the user to effectively improve his or her skill for performing the pedal keyboard PK.

Other Embodiments

Although the manual keyboard HK in the above-described embodiment includes the upper keyboard UK and lower keyboard LK, vertically divided from each other, the manual keyboard HK may include only one row of keyboard, and such one row of keyboard may be divided in a left-right direction into a key region for an accompaniment performance and a key region for a melody performance. The key region for an accompaniment performance is operated mainly with the left hand, while the key region for a melody performance is operated mainly with the right hand. In this case, an image corresponding to the key region for an accompaniment performance is displayed as the manual keyboard image, and manual keys corresponding to one or more chord pitches are designated on the displayed image.

In the above-described embodiments, output accompaniment data are generated on the basis of user's operations of the lower keyboard LK and pedal keyboard PK, and automatic accompaniment sounds are output on the basis of the thus-generated output accompaniment data. However, as a modification, data indicative of a note train of automatic accompaniment sounds may be prepared in advance per music piece in such a manner that the automatic accompaniment sounds are output on the basis of the thus-prepared data.

Figure 8:
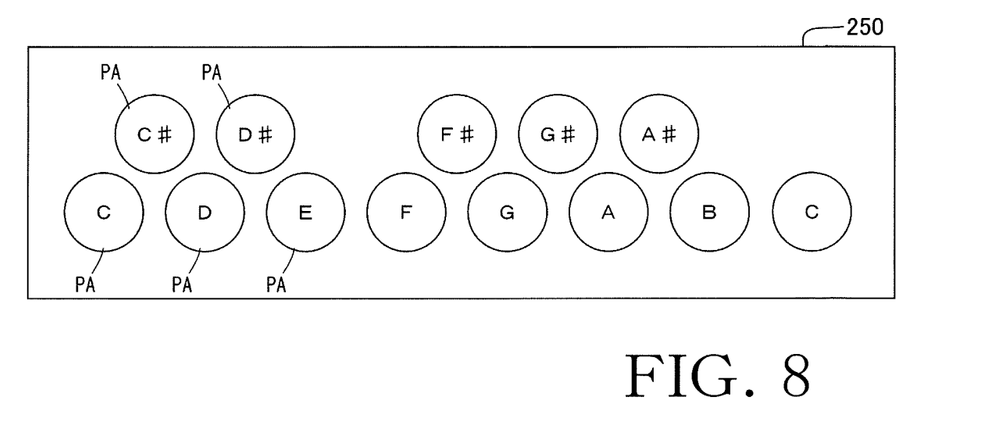
FIG. 8 is a diagram illustrating a performance apparatus including another type of foot operator group.

Although in the above-described embodiments, the pedal keyboard PK is used as an example of the foot operator group to be operated with the user's feet, another type of foot operator group may be used in place of the pedal keyboard PK. FIG. 8 is a diagram illustrating a performance apparatus including such another type of foot operator group. The performance apparatus 250 of FIG. 8 includes, as an example of the foot operator group, a plurality of operating pads PA operable with the user's feet. Different pitches are assigned respectively to the operating pads PA. In FIG. 8, the pitches assigned to the individual operating pads PA are indicated on the operating pads PA. In the case where the performance apparatus 250 of FIG. 8 is employed, a foot operator group image corresponding to the plurality of operating pads PA is displayed on the display. Further, each operating pad PA to be operated is designated on the displayed foot operator group image.

Further, another type of manual operator group, including a plurality of operating pads that are for example similar to the operating pads of FIG. 8, may be used in place of the manual keyboard HK. Furthermore, a plurality of operators displayed on a touch display panel may be used as the foot operator group or manual operator group.

In the above-described embodiments, the individual functional sections of FIG. 6 are implemented by hardware, such as the CPU 11, and software, such as the performance assistance program. Namely, in the embodiment illustrated in FIGS. 1, 7, and the like, a main construction that implements the inventive performance assistance apparatus and/or method is provided by the CPU 11 (namely, processor) executing a necessary application program stored in the RAM 9, ROM 10, or storage device 13 (namely, memory).

More specifically, the inventive performance apparatus in each of the above-described embodiments includes the processor (CPU 11), and the CPU 11 is configured to execute: displaying on the display device (6) the foot operator image (PIM) indicative of the foot operator group (PK) (operation of step S7); acquiring the chord information indicative of a chord to be performed (operation of step S4); identifying a bass note corresponding to the chord indicated by the acquired chord information (operation of step S16); and visually designating, on the foot operator image (PIM) displayed on the display device (6), a particular foot operator corresponding to the identified pitch of the identified bass note (operation of step S17). However, the inventive performance assistance apparatus is not so limited, and the individual functional sections illustrated in FIG. 6 may be implemented by a hardware device designed, using electronic circuitry etc., exclusively for the performance assistance purposes.

Although the embodiments of the present invention have been described above as applied to the electronic musical instrument 1 including the display 6, the present invention may be applied to an electronic musical instrument connectable (capable of communicating) with an external display device of a smartphone, tablet terminal, or the like. In such a case, the electronic musical instrument 1 is communicatably connected with the external display device of the smartphone, tablet terminal, or the like in a wireless or wired manner via the communication I/F (interface) 14, and a musical score, foot operator group image (such as the pedal keyboard image PIM), manual operator group image (such as the lower keyboard image LIM), and the like are displayed on the external display device by the external display device functioning in a similar manner to the display 6 shown and described in relation to the above-described embodiments.

In the above-described embodiments, in response to the user operating a particular pedal k3 visually designated on the pedal keyboard image PIM, an automatic bass sound based on an automatic accompaniment pattern is generated by the automatic accompaniment section 109 at a pitch corresponding to a chord identified on the basis of performance operations of the lower keyboard LK and pedal keyboard PK. However, the present invention is not so limited, and in response to the user manually operating the particular pedal k3 visually designated on the pedal keyboard image PIM, a bass sound corresponding to the manually operated pedal key k3 may be generated and output directly from the sound generator 16. In such a case, the pitch of the bass note identified by the pitch identification section 106 in association with the chord may be any appropriate chord pitch other than the bass pitch of the chord (root pitch or lowest note of a fraction chord). Further, the pitch of the bass note identified in association with a chord is not limited to just one pitch; pitches of one or more bass notes may be designated sequentially as the pitch of the bass note identified in association with the chord.

According to one aspect of the aforementioned embodiment, the performance assistance apparatus is suited for application to a performance apparatus provided with a foot operator group including a plurality of foot operators that are operable with a foot of a human player and that have different pitches (namely, sound pitches) assigned respectively thereto, and the performance assistance apparatus includes: a display control means that causes a display device to display a foot operator image indicative of the foot operator group; an acquisition means that acquires chord information indicative of a chord to be performed; an identification means that identifies a pitch of a bass note corresponding to the chord indicated by the acquired chord information; and a designation means that visually designates, on the foot operator image displayed on the display device, a particular foot operator corresponding to the identified pitch of the bass note.

According to another aspect of the aforementioned embodiment, the display control means may further cause the display device to display an object indicative of a chord name of the chord indicated by the acquired chord information, and the designation means may visually designate the particular foot operator in synchronism with the displaying of the object indicative of the chord name. With such arrangements, even a human player having poor knowledge of chords can easily understand/learn a correspondence relationship between chords and foot operators (bass notes) to be operated (or performed) and can effectively execute performance training of the foot operators corresponding to chords.

According to further aspect of the aforementioned embodiment, the performance apparatus may be further provided with a manual operator group including a plurality of manual operators that are operable with a hand of the human player and that have different pitches assigned respectively thereto, the display control means may cause the display device to display a manual operator image indicative of at least a portion of the manual operator group, and the identification means may identify pitches of one or more notes included in notes constituting the chord indicated by the acquired chord information. The performance assistance apparatus may further include a manual operator designation means that visually designates, on the manual operator image displayed on the display device, a plurality of the manual operators corresponding to the identified pitches of the one or more notes included in the notes constituting the chord. With such arrangements, by looking at the manual operator image and foot operator image displayed together on a same display screen of the display device, the human player can intuitively know or identify each manual operator and foot operator to be operated. Thus, the human player can easily master appropriate operations of the manual operator group and foot operator group that correspond to chords. As a result, the performance assistance apparatus enables the human player to effectively improve his or her skill for performing the manual operator group and foot operator group.

According to further aspect of the aforementioned embodiment, the performance assistance apparatus may further comprise a storage means that, for each of a plurality of chords, prestores information identifying pitches of one or more notes included in notes constituting the chord, and the identification means may identify, on the basis of the information stored in the storage means, pitches of one or more notes included in the notes constituting the chord indicated by the acquired chord information. Thus, for each of the plurality of chords, it is possible to identify the pitches of the one or more notes included in the notes constituting the chord, without requiring complicated processing.

According to further aspect of the aforementioned embodiment, the manual operator group may include a first manual operator group that is used for a melody performance and a second manual operator group that is used for an accompaniment performance, the display control means may cause the display device to display, as the manual operator image, a manual operator image indicative of at least a portion of the second manual operator group, and the manual operator designation means may visually designate, on the manual operator image indicative of at least a portion of the second manual operator group displayed on the display device, a plurality of the manual operators corresponding to the identified pitches of the one or more notes included in the notes constituting the chord. In this case, the human player can perform a melody by operating manual operators of the first manual operator group, while performing accompaniment notes by operating manual operators of the second manual operator group.

According to further aspect of the aforementioned embodiment, the identification means may identify the pitches of the one or more notes included in the notes constituting the chord in such a manner that the lowest pitch of the identified pitches is included within a predetermined portion of a pitch range of the manual operator group. Such arrangements allow pitches of respective constituent notes of a plurality of different chords to get close to one another, and thus, when the human player performs chords in accordance with the visual designation of the identified pitches of the one or more notes of each of the chords to be performed, it becomes easier for the human player to operate the manual operators corresponding to the constituent notes of the chord. In addition, because the aforementioned arrangements can limit or reduce a width of pitch changes of the chord constituent notes occurring with a chord progression, the human player can perform the pitches of the chord constituent notes with a natural flow.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A performance assistance apparatus for application to a performance apparatus provided with a foot operator group including a plurality of foot operators that are operable with a foot of a human player and that have different pitches assigned respectively thereto, the performance assistance apparatus comprising:
   a storage medium storing a program; and
   a processor for executing the program, the processor, when executing the program, configured to:
   cause a display device to display a foot operator image indicative of the foot operator group;
   cause the display device to display a portion of a music score of a music piece in such a manner that the portion of the music score to be displayed is updated in accordance with a progression of the music piece, the portion of the music score including a plurality of measures;
   visually add, to the displayed portion of the music score, a display object indicative of a current position according to the progression of the music piece;
   acquire chord information indicative of a chord to be performed at the current position according to the progression of the music piece;
   identify a pitch of a bass note corresponding to the chord indicated by the acquired chord information; and
   visually designate, on the foot operator image displayed on the display device, a particular foot operator corresponding to the identified pitch of the bass note, the particular foot pedal being a foot operator to be performed at the current position according to the progression of the music piece.

2. The performance assistance apparatus as claimed in claim 1, wherein the processor is further configured to cause the display device to simultaneously display, over the displayed portion of the music score, one or more objects indicative of one or more chord names corresponding to a chord progression.

3. The performance assistance apparatus as claimed in claim 2, wherein the one or more objects indicative of one or more chord names are visually added to the displayed portion of the music score.

4. The performance assistance apparatus as claimed in claim 1, wherein the processor is configured to identify, as the pitch of the bass note, a root note or a bass-designating note of the chord indicated by the acquired chord information.

5. The performance assistance apparatus as claimed in claim 1, wherein the processor is configured to sequentially identify pitches of one or more bass notes in association with the chord indicated by the acquired chord information.

6. The performance assistance apparatus as claimed in claim 1, wherein the performance apparatus is further provided with a manual operator group including a plurality of manual operators that are operable with a hand of the human player and that have different pitches assigned respectively thereto,
   the processor is configured to cause the display device to display a manual operator image indicative of at least a portion of the manual operator group,
   the processor is configured to identify pitches of one or more notes included in notes constituting the chord indicated by the acquired chord information, and
   the processor is further configured to visually designate, on the manual operator image displayed on the display device, a plurality of the manual operators corresponding to the identified pitches of the one or more notes included in the notes constituting the chord.

7. The performance assistance apparatus as claimed in claim 6, further comprising a memory that, for each of a plurality of chords, prestores information identifying pitches of one or more notes included in notes constituting the chord, and
   the processor is configured to identify, based on the information stored in the memory, pitches of one or more notes included in the notes constituting the chord indicated by the acquired chord information.

8. The performance assistance apparatus as claimed in claim 6, wherein the manual operator group includes a first manual operator group that is used for a melody performance and a second manual operator group that is used for an accompaniment performance,
   the processor is configured to cause the display device to display, as the manual operator image, a manual operator image indicative of at least a portion of the second manual operator group, and
   the processor is configured to visually designate, on the manual operator image indicative of at least a portion of the second manual operator group displayed on the display device, a plurality of the manual operators corresponding to the identified pitches of the one or more notes included in the notes constituting the chord.

9. The performance assistance apparatus as claimed in claim 6, wherein the processor is configured to identify the pitches of the one or more notes included in notes constituting the chord in such a manner that a lowest pitch of the identified pitches is included within a predetermined portion of a pitch range of the manual operator group.

10. The performance assistance apparatus as claimed in claim 1, wherein the foot operator group provided in the performance apparatus is a pedal keyboard, and the processor is configured to cause the display device to display an image indicative of the pedal keyboard as the foot operator image.

11. The performance assistance apparatus as claimed in claim 1, which includes the display device provided therein.

12. The performance assistance apparatus as claimed in claim 1, which includes a communication interface such that the performance assistance apparatus is capable of communicating with the display device provided outside the performance assistance apparatus.

13. A computer-implemented performance assistance method for application to a performance apparatus provided with a foot operator group including a plurality of foot operators that are operable with a foot of a human player and that have different pitches assigned respectively thereto, the performance assistance method comprising:
  causing a display device to display a foot operator image indicative of the foot operator group;
  causing the display device to display a portion of a music score of a music piece in such a manner that the portion of the music score to be displayed is updated in accordance with a progression of the music piece, the portion of the music score including a plurality of measures;
  visually adding, to the displayed portion of the music score, a display object indicative of a current position according to the progression of the music piece;
  acquiring chord information indicative of a chord to be performed at the current position according to the progression of the music piece;
  identifying a pitch of a bass note corresponding to the chord indicated by the acquired chord information; and
  visually designating, on the foot operator image displayed on the display device, a particular foot operator corresponding to the identified pitch of the bass note, the particular foot pedal being a foot operator to be performed at the current position according to the progression of the music piece.

14. The performance assistance method as claimed in claim 13, further comprising causing the display device to simultaneously display, over the displayed portion of the music score, one or more objects indicative of one or more chord names corresponding to a chord progression.

15. The performance assistance method as claimed in claim 14, wherein the one or more objects indicative of one or more chord names are visually added to the displayed portion of the music score.

16. The performance assistance method as claimed in claim 13, wherein the pitch of the bass note corresponding to the chord is identified by a root note or a bass-designating note of the chord indicated by the acquired chord information.

17. The performance assistance method as claimed in claim 13, wherein the pitch of the bass note corresponding to the chord is sequentially identified by one or more bass notes in association with the chord indicated by the acquired chord information.

18. The performance assistance method as claimed in claim 13, wherein the performance apparatus is further provided with a manual operator group including a plurality of manual operators that are operable with a hand of the human player and that have different pitches assigned respectively thereto, the performance assistance method further comprising:
  causing the display device to display a manual operator image indicative of at least a portion of the manual operator group;
  identifying pitches of one or more notes included in notes constituting the chord indicated by the acquired chord information, and
  visually designating, on the manual operator image displayed on the display device, a plurality of the manual operators corresponding to the identified pitches of the one or more notes included in the notes constituting the chord.

19. The performance assistance method as claimed in claim 18, wherein the manual operator group includes a first manual operator group that is used for a melody performance and a second manual operator group that is used for an accompaniment performance,
  the manual operator image is a manual operator image indicative of at least a portion of the second manual operator group, and
  the plurality of the manual operators are visually designated, on the manual operator image indicative of at least a portion of the second manual operator group displayed on the display device, a plurality of the manual operators corresponding to the identified pitches of the one or more notes included in the notes constituting the chord.

20. A non-transitory machine-readable storage medium containing a program executable by a processor to perform a performance assistance method for application to a performance apparatus provided with a foot operator group including a plurality of foot operators that are operable with a foot of a human player and that have different pitches assigned respectively thereto, the performance assistance method comprising:
  causing a display device to display a foot operator image indicative of the foot operator group;
  causing the display device to display a portion of a music score of a music piece in such a manner that the portion of the music score to be displayed is updated in accordance with a progression of the music piece, the portion of the music score including a plurality of measures;
  visually adding, to the displayed portion of the music score, a display object indicative of a current position according to the progression of the music piece;
  acquiring chord information indicative of a chord to be performed at the current position according to the progression of the music piece;
  identifying a pitch of a bass note corresponding to the chord indicated by the acquired chord information; and
  visually designating, on the foot operator image displayed on the display device, a particular foot operator corresponding to the identified pitch of the bass note, the particular foot pedal being a foot operator to be performed at the current position according to the progression of the music piece.

* * * * *